US008515753B2

(12) United States Patent
Kim et al.

(10) Patent No.: US 8,515,753 B2
(45) Date of Patent: Aug. 20, 2013

(54) ACOUSTIC MODEL ADAPTATION METHODS BASED ON PRONUNCIATION VARIABILITY ANALYSIS FOR ENHANCING THE RECOGNITION OF VOICE OF NON-NATIVE SPEAKER AND APPARATUS THEREOF

(75) Inventors: Hong Kook Kim, Gwangju (KR); Yoo Rhee Oh, Gwangju (KR); Jae Sam Yoon, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 1046 days.

(21) Appl. No.: 12/225,801

(22) PCT Filed: Mar. 30, 2007

(86) PCT No.: PCT/KR2007/001573

§ 371 (c)(1), (2), (4) Date: Nov. 10, 2008

(87) PCT Pub. No.: WO2007/114605

PCT Pub. Date: Oct. 11, 2007

(65) Prior Publication Data

US 2009/0119105 A1 May 7, 2009

(30) Foreign Application Priority Data

Mar. 31, 2006 (KR) ........................ 10-2006-0029321

(51) Int. Cl.
*G10L 15/06* (2006.01)

(52) U.S. Cl.
USPC ........... 704/244; 704/278; 704/276; 704/270; 704/255; 704/254; 704/251; 704/249; 704/240; 704/237; 704/233; 704/235; 704/200; 700/1; 370/259; 706/11

(58) Field of Classification Search
USPC ................. 704/255, 251, 278, 276, 270, 254, 704/249, 244, 240, 237, 233, 235, 200; 700/1; 370/259; 706/11
See application file for complete search history.

(56) References Cited

U.S. PATENT DOCUMENTS 4,931,950 A * 6/1990 Isle et al. ........................ 706/11
5,497,373 A * 3/1996 Hulen et al. .................. 370/259
5,664,059 A * 9/1997 Zhao ............................ 704/254
5,680,509 A * 10/1997 Gopalakrishnan et al. ... 704/240
5,794,192 A * 8/1998 Zhao ............................ 704/244

(Continued)

FOREIGN PATENT DOCUMENTS

KR 10-2004-0055292 6/2004
KR 10-2005-0032759 4/2005

*Primary Examiner* — Michael Colucci
(74) *Attorney, Agent, or Firm* — Harness, Dickey & Pierce, P.L.C.

(57) ABSTRACT

The example embodiment of the present invention provides an acoustic model adaptation method for enhancing recognition performance for a non-native speaker's speech. In order to adapt acoustic models, first, pronunciation variations are examined by analyzing a non-native speaker's speech. Thereafter, based on variation pronunciation of a non-native speaker's speech, acoustic models are adapted in a state-tying step during a training process of acoustic models. When the present invention for adapting acoustic models and a conventional acoustic model adaptation scheme are combined, more-enhanced recognition performance can be obtained. The example embodiment of the present invention enhances recognition performance for a non-native speaker's speech while reducing the degradation of recognition performance for a native speaker's speech.

8 Claims, 8 Drawing Sheets

(56) References Cited

U.S. PATENT DOCUMENTS

| | | | | |
|---|---|---|---|---|
| 5,864,810 | A * | 1/1999 | Digalakis et al. | 704/255 |
| 6,029,124 | A * | 2/2000 | Gillick et al. | 704/200 |
| 6,085,160 | A | 7/2000 | D'Hoore et al. | |
| 6,253,181 | B1 * | 6/2001 | Junqua | 704/255 |
| 6,912,499 | B1 | 6/2005 | Sabourin et al. | |
| 7,315,818 | B2 * | 1/2008 | Stevens et al. | 704/235 |
| 7,716,050 | B2 * | 5/2010 | Gillick et al. | 704/254 |
| 7,912,721 | B2 * | 3/2011 | Dow et al. | 704/270 |
| 2002/0138265 | A1 * | 9/2002 | Stevens et al. | 704/251 |
| 2003/0036903 | A1 * | 2/2003 | Konopka et al. | 704/249 |
| 2005/0203751 | A1 * | 9/2005 | Stevens et al. | 704/276 |
| 2006/0064177 | A1 * | 3/2006 | Tian et al. | 700/1 |
| 2006/0149558 | A1 * | 7/2006 | Kahn et al. | 704/278 |
| 2007/0005355 | A1 * | 1/2007 | Tian et al. | 704/237 |
| 2007/0033028 | A1 * | 2/2007 | Yao | 704/233 |

* cited by examiner

Fig. 6

Recognized monophone

Monophone which must be recognized

| | AA | AE | AH | AO | AW | AY | EH | EY | IH | IY | UH | OW | OY | UW | ER | R |
|---|---|---|---|---|---|---|---|---|---|---|---|---|---|---|---|---|
| AA | 42.45 | 2.12 | 2.40 | 3.81 | 2.68 | 1.69 | 0.56 | 0.00 | 0.14 | 0.00 | 0.28 | 1.27 | 0.14 | 0.14 | 0.42 | 1.13 |
| AE | 1.22 | 40.92 | 4.73 | 0.92 | 1.07 | 0.46 | 10.99 | 2.14 | 1.37 | 0.61 | 0.61 | 1.07 | 0.00 | 1.53 | 0.46 | 2.60 |
| AH | 4.74 | 0.86 | 39.84 | 2.77 | 3.02 | 1.05 | 0.92 | 0.49 | 1.54 | 0.99 | 0.49 | 2.52 | 0.00 | 1.23 | 0.92 | 5.42 |
| AO | 10.83 | 0.16 | 4.14 | 27.87 | 1.91 | 1.27 | 0.64 | 0.00 | 0.64 | 0.64 | 0.48 | 9.87 | 0.16 | 1.75 | 1.75 | 4.62 |
| AW | 6.90 | 0.69 | 4.14 | 4.83 | 34.83 | 1.38 | 0.00 | 0.34 | 1.03 | 0.34 | 0.00 | 2.07 | 0.00 | 0.69 | 0.69 | 5.17 |
| AY | 1.49 | 0.82 | 1.12 | 0.15 | 0.37 | 58.89 | 0.00 | 0.67 | 0.30 | 5.23 | 0.07 | 0.67 | 0.00 | 0.37 | 0.15 | 1.35 |
| EH | 1.86 | 13.44 | 5.57 | 1.09 | 2.19 | 0.55 | 27.98 | 5.14 | 2.08 | 4.04 | 0.55 | 0.77 | 0.00 | 1.31 | 0.22 | 1.09 |
| EY | 0.27 | 2.07 | 6.94 | 0.09 | 0.27 | 0.90 | 1.08 | 56.45 | 1.44 | 2.52 | 0.54 | 0.27 | 0.09 | 0.99 | 0.09 | 0.27 |
| IH | 0.80 | 0.48 | 5.31 | 0.24 | 0.80 | 0.16 | 2.41 | 6.03 | 24.60 | 22.91 | 0.72 | 0.72 | 0.00 | 3.14 | 0.08 | 0.32 |
| IY | 0.09 | 0.46 | 2.40 | 0.00 | 0.18 | 0.09 | 0.37 | 3.87 | 2.03 | 54.19 | 0.09 | 0.55 | 0.18 | 1.20 | 0.09 | 0.28 |
| UH | 2.02 | 1.01 | 11.11 | 1.35 | 1.68 | 1.01 | 2.69 | 0.34 | 1.68 | 0.67 | 13.47 | 16.16 | 0.00 | 11.78 | 1.35 | 8.42 |
| OW | 2.93 | 0.00 | 6.11 | 4.65 | 1.22 | 0.49 | 0.24 | 0.24 | 2.20 | 0.00 | 0.49 | 27.38 | 0.00 | 1.47 | 0.98 | 6.85 |
| OY | 0.00 | 0.00 | 7.38 | 4.70 | 0.00 | 2.68 | 0.00 | 2.68 | 8.05 | 19.46 | 0.00 | 0.67 | 12.08 | 1.34 | 1.34 | 10.07 |
| UW | 0.66 | 0.25 | 4.97 | 0.41 | 0.75 | 0.25 | 1.24 | 0.00 | 1.16 | 0.08 | 0.75 | 6.13 | 0.00 | 40.43 | 1.66 | 3.31 |
| ER | 3.61 | 1.53 | 4.58 | 1.11 | 2.50 | 0.97 | 0.14 | 0.14 | 0.28 | 0.83 | 0.69 | 1.53 | 0.00 | 0.83 | 17.78 | 17.22 |
| R | 0.52 | 0.74 | 2.45 | 0.30 | 0.82 | 0.52 | 0.37 | 0.22 | 0.59 | 0.45 | 0.00 | 1.19 | 0.00 | 0.45 | 2.75 | 33.21 |

Fig. 7

Recognized monophone

Monophone which must be recognized

| | P | B | F | V | T | D | S | Z | DH | TH | JH | ZH | SH | CH | K | G | HH | M | N | NG | L | Y | W |
|---|---|---|---|---|---|---|---|---|---|---|---|---|---|---|---|---|---|---|---|---|---|---|---|
| P | 24.22 | 5.27 | 0.86 | 0.32 | 10.55 | 9.58 | 0.00 | 0.00 | 0.65 | 0.11 | 0.00 | 0.11 | 0.00 | 0.11 | 7.10 | 0.22 | 4.41 | 0.86 | 1.83 | 0.22 | 1.51 | 0.22 | 1.38 |
| B | 4.43 | 41.34 | 3.36 | 0.81 | 2.42 | 4.97 | 0.54 | 0.00 | 1.34 | 0.54 | 0.54 | 0.00 | 0.00 | 0.00 | 0.40 | 0.00 | 3.22 | 1.21 | 2.01 | 0.00 | 1.61 | 0.27 | 0.40 |
| F | 3.34 | 8.59 | 23.37 | 1.11 | 10.49 | 6.52 | 0.48 | 0.00 | 0.79 | 1.27 | 0.16 | 0.00 | 0.00 | 0.79 | 3.18 | 0.16 | 3.02 | 1.11 | 0.95 | 0.00 | 1.27 | 0.32 | 0.16 |
| V | 2.75 | 4.96 | 1.65 | 13.22 | 11.29 | 13.77 | 1.38 | 0.00 | 1.10 | 1.38 | 0.83 | 0.00 | 0.00 | 0.55 | 3.03 | 0.55 | 0.83 | 2.48 | 3.03 | 0.55 | 2.20 | 0.00 | 0.28 |
| T | 1.81 | 0.81 | 0.31 | 0.12 | 49.40 | 10.54 | 0.31 | 0.08 | 0.31 | 0.19 | 0.08 | 0.00 | 0.04 | 0.23 | 4.81 | 0.54 | 1.15 | 0.23 | 0.85 | 0.31 | 1.42 | 0.31 | 0.00 |
| D | 1.53 | 3.86 | 0.33 | 0.33 | 9.9 | 42.98 | 0.07 | 0.00 | 0.73 | 0.60 | 0.47 | 0.07 | 0.07 | 0.20 | 3.86 | 1.09 | 1.20 | 1.00 | 2.20 | 1.13 | 1.40 | 0.13 | 0.13 |
| S | 0.79 | 2.48 | 8.24 | 0.74 | 6.87 | 6.39 | 33.60 | 1.53 | 0.63 | 1.37 | 0.21 | 0.00 | 0.42 | 0.21 | 2.43 | 0.53 | 0.53 | 0.69 | 0.90 | 0.05 | 0.95 | 0.11 | 0.16 |
| Z | 0.39 | 1.35 | 0.39 | 1.16 | 11.80 | 14.70 | 4.45 | 20.31 | 1.93 | 2.90 | 0.39 | 0.00 | 0.39 | 0.19 | 2.51 | 0.97 | 0.97 | 1.55 | 1.93 | 1.74 | 1.55 | 0.77 | 0.00 |
| DH | 1.00 | 5.38 | 1.20 | 0.40 | 5.78 | 6.97 | 0.20 | 0.20 | 35.66 | 0.60 | 1.00 | 0.00 | 0.00 | 0.00 | 2.39 | 0.60 | 2.99 | 0.20 | 3.78 | 0.20 | 0.20 | 0.20 | 0.00 |
| TH | 0.84 | 5.91 | 1.69 | 1.69 | 13.08 | 15.61 | 5.06 | 0.42 | 0.84 | 16.88 | 2.53 | 0.00 | 0.84 | 0.00 | 4.22 | 0.84 | 0.84 | 1.27 | 2.53 | 0.42 | 3.38 | 0.00 | 0.00 |
| JH | 0.68 | 3.41 | 0.68 | 0.34 | 11.60 | 11.95 | 2.05 | 1.02 | 0.68 | 0.34 | 9.56 | 0.00 | 1.02 | 0.68 | 1.37 | 1.02 | 0.00 | 0.00 | 1.37 | 1.37 | 0.34 | 2.39 | 0.00 |
| ZH | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| SH | 0.86 | 1.44 | 3.45 | 0.00 | 6.03 | 4.31 | 6.32 | 1.44 | 0.29 | 0.86 | 5.75 | 0.86 | 29.89 | 4.89 | 2.87 | 0.29 | 1.72 | 0.00 | 2.87 | 0.57 | 0.57 | 1.15 | 0.06 |
| CH | 2.21 | 1.47 | 0.37 | 0.00 | 29.78 | 7.35 | 5.15 | 0.37 | 0.37 | 0.74 | 2.21 | 0.00 | 0.74 | 8.09 | 6.62 | 0.37 | 1.84 | 0.00 | 1.84 | 0.37 | 0.37 | 1.47 | 0.00 |
| K | 1.56 | 0.68 | 0.00 | 0.19 | 11.55 | 3.84 | 0.25 | 0.12 | 0.00 | 0.12 | 0.00 | 0.00 | 0.37 | 0.25 | 42.84 | 0.68 | 1.98 | 0.19 | 1.30 | 0.00 | 1.30 | 0.00 | 0.06 |
| G | 1.36 | 4.32 | 1.14 | 0.68 | 11.36 | 10.91 | 0.00 | 0.00 | 0.91 | 0.23 | 0.91 | 0.00 | 0.00 | 1.14 | 9.09 | 13.18 | 3.18 | 1.36 | 2.73 | 0.00 | 5.00 | 0.23 | 0.45 |
| HH | 2.15 | 4.04 | 0.94 | 0.13 | 4.44 | 0.40 | 0.13 | 0.00 | 0.00 | 0.00 | 0.27 | 0.00 | 0.27 | 0.00 | 7.67 | 0.94 | 38.36 | 0.67 | 0.40 | 0.00 | 2.15 | 0.40 | 0.67 |
| M | 0.19 | 4.88 | 0.10 | 0.29 | 2.58 | 6.12 | 0.00 | 0.29 | 0.62 | 0.00 | 0.10 | 0.00 | 0.10 | 0.00 | 0.57 | 0.38 | 1.34 | 30.31 | 14.91 | 0.76 | 2.87 | 0.10 | 0.48 |
| N | 0.19 | 0.51 | 0.06 | 0.13 | 2.31 | 7.37 | 0.00 | 0.00 | 0.26 | 0.00 | 0.32 | 0.00 | 0.06 | 0.13 | 0.71 | 0.26 | 0.45 | 3.78 | 47.18 | 2.18 | 1.67 | 0.77 | 0.19 |
| NG | 0.00 | 0.00 | 0.31 | 0.31 | 2.76 | 6.75 | 0.00 | 0.00 | 0.31 | 0.00 | 0.00 | 0.00 | 0.00 | 0.00 | 0.00 | 0.00 | 0.31 | 6.13 | 12.27 | 27.91 | 1.53 | 0.31 | 0.00 |
| L | 0.30 | 1.78 | 0.67 | 0.74 | 5.63 | 5.63 | 0.37 | 0.07 | 0.59 | 0.00 | 0.30 | 0.00 | 0.15 | 0.00 | 2.52 | 0.44 | 1.70 | 4.67 | 11.63 | 0.15 | 30.67 | 0.07 | 0.15 |
| Y | 0.51 | 0.00 | 0.00 | 0.51 | 1.02 | 3.05 | 0.51 | 0.00 | 0.51 | 0.51 | 0.51 | 0.00 | 0.00 | 0.00 | 1.02 | 1.02 | 5.08 | 0.00 | 2.03 | 0.00 | 1.02 | 42.13 | 0.00 |
| W | 1.15 | 0.54 | 0.58 | 0.96 | 2.69 | 0.38 | 0.00 | 0.00 | 1.35 | 0.00 | 0.38 | 0.00 | 0.19 | 0.00 | 0.96 | 0.19 | 4.04 | 5.00 | 5.00 | 0.00 | 15.00 | 0.00 | 24.2. |

Fig. 8

| Target \ Recognized | /T/ | /R/ | /IY/ | /AE/ | /OW/ |
|---|---|---|---|---|---|
| /CH/ | **20.78** | - | - | - | - |
| /IH/ | - | 0.32 | **22.91** | 0.48 | 0.72 |
| /OY/ | - | 10.07 | **19.46** | 0.00 | 0.67 |
| /ER/ | - | **17.22** | 0.83 | 1.53 | 1.53 |
| /UH/ | - | 8.42 | 0.67 | 1.01 | **16.16** |
| /EH/ | - | 1.09 | 4.04 | **13.44** | 0.77 |

ACOUSTIC MODEL ADAPTATION METHODS BASED ON PRONUNCIATION VARIABILITY ANALYSIS FOR ENHANCING THE RECOGNITION OF VOICE OF NON-NATIVE SPEAKER AND APPARATUS THEREOF

TECHNICAL FIELD

The present invention relates to an acoustic model adaptation method based on the pronunciation variability in order to enhance the performance of a speech recognition system for non-native speaker, and an apparatus using the same, and more particularly to a method of adapting an acoustic model of a speech recognition system in order to enhance the recognition performance for speech of non-native speaker.

BACKGROUND ART

In general, since a speech recognition system is trained by the speech of a native speaker, the speech recognition system is optimized for the speech of a native speaker. Therefore, such a speech recognition system has an excellent performance in the recognition for the speech of a native speaker, but has a poor performance in the recognition for the speech of a non-native speaker.

FIG. 1 shows an example of the effect of recognition performance for a Korean speaker's English pronunciation in an English speech recognition system. That is, with an English speech recognition system which has been trained by using English speech training data by the speech of a native English speaker, when the English training speech data are recognized by a native speaker, a word error rate of 4.21% occurs. In contrast, when the English training speech data are recognized by a Korean speaker, a word error rate of 39.22% occurs, which shows that the recognition performance of the speech recognition system is considerably degraded.

In order to enhance the recognition performance for a non-native speaker, there is a method of making a recognition system trained by the training speech data by a non-native speaker. However, database of non-native speakers' speeches for training of the speech recognition system is not yet sufficient. Currently, as an English speech database for training of the speech recognition system by Korean speakers, "English Pronunciation by Korean" is provided by the Speech Information Technology & Industry Promotion Center.

A continuous speech recognition system roughly includes two modules (i.e., a feature vector extraction module and a speech recognition module) and three models (an acoustic model, a pronunciation model and a language model), as shown in FIG. 2. In other words, when speech is inputted to the continuous speech recognition system, a feature vector is extracted from the inputted speech through the feature extraction module. Generally, in order to create a speech recognition system, 12 Mel Frequency Cepstral Coefficients (MFCCs), log energy, and their first and second order derivatives are used as a feature vector. For a feature vector extracted from a speech, an acoustic model, a pronunciation model, a language model, etc. are found from the speech recognition module. Therefore, studies for performance enhancement of a speech recognition system for non-native speakers are classified into an acoustic model point of view, a pronunciation model point of view, and a language model point of view. The present invention is proposed in consideration of the acoustic model point of view.

According to the acoustic model theory of view, the acoustic model of a speech recognition system is adapted in order to enhance the recognition performance for a non-native speaker. This is roughly classified into an acoustic model retraining method by the speech of a non-native speaker, and an acoustic model adaptation method using the speech of a non-native speaker. First, the acoustic model retraining method requires a great amount of speech from non-native speakers, and also greatly degrades the recognition performance for native speakers while enhancing the recognition performance for non-native speakers.

FIG. 3 shows an example of recognition performance when an acoustic model is retrained by a Korean speaker's English speech. That is, referring to FIG. 3, when input speech is recognized by the acoustic model retrained by the Korean speaker's English speech, a word error rate of a Korean speaker's English speech is 26.87% and thus the word error rate is relatively reduced by about 31.49%, but a word error rate of a native speaker's English speech is 42.07% and thus the word error rate is relatively increased by about 899.29%. Consequently, it can be understood that the average word error rate of the Korean speaker's English speech and the native speaker's English speech is 34.47% and thus the word error rate is relatively increased by about 58.71%. For this reason, the acoustic model adaptation method using speech of a non-native speaker is widely used, instead of the acoustic model retraining method by the speech of a non-native speaker. Representative acoustic model adaptation methods include a maximum likelihood linear regression (MLLR) scheme and a maximum a posteriori (MAP) scheme.

FIG. 4 shows an example of the average recognition performance of a Korean speaker's English speech and a native speaker's English speech when the MLLR and MAP adaptation schemes are applied to an acoustic model trained by a native speaker's English speech. In this case, since recognition performances for a native speaker's English speech are similar regardless of whether or not an acoustic model adaptation scheme is applied, only the average recognition performance will be considered. When the MAP is applied, a word error rate is 9.80% and thus the word error rate is relatively reduced by about 54.88%. When the MLLR is applied, a word error rate is 12.81% and thus the word error rate is relatively reduced by about 41.02%. When the MLLR and MAR are combined and used, a word error rate is 10.26% and thus the word error rate is relatively reduced by about 52.72%. Accordingly, it can be understood that when an acoustic model adaptation scheme, such as the MAP, MLLR, etc., is applied, the average recognition performance of a Korean speaker's English speech and a native speaker's English speech is enhanced.

DISCLOSURE OF INVENTION

Technical Problem

However, in spite of efforts for enhancing the recognition performance of the speech recognition system over the past several decades, it is still necessary to enhance the recognition performance in order to apply the speech recognition system to real life.

Technical Solution

Accordingly, the present invention has been made to solve the above-mentioned problems occurring in the prior art, and the present invention provides a method and apparatus for adapting acoustic models based on a pronunciation variation analysis of a non-native speaker's speech for reducing the degradation in the recognition performance for a native speaker's speech and enhancing the recognition performance for a non-native speaker's speech in a speech recognition system.

Therefore, the present invention provides a vinyl biphenyl pyridine monomer, and a single polymer and a block copolymer using the same.

In accordance with an aspect of the present invention, there is provided an acoustic model adaptation method including the steps of: a pronunciation variation analysis step for examining a variation pronunciation of a non-native speaker through pronunciation analysis of a non-native speaker's speech; and a step for adapting an acoustic model by using the analyzed variation pronunciation so that the acoustic model may be adapted for the non-native speaker's speech.

Preferably, according to example embodiment of the present invention, the pronunciation variation analysis step may include the steps of: creating a speech recognition system which has been trained by a native speaker's speech; making the speech recognition system recognize a non-native speaker's speech, and then creating a monophone confusion matrix; and obtaining the variation pronunciation by analyzing the monophone confusion matrix.

Preferably, according to example embodiments of the present invention, the step for creating the speech recognition system which has been trained by the native speaker's speech includes the steps of: creating monophone-based acoustic models by using training data by a native speaker; expanding the monophone-based acoustic models to triphone-based acoustic models and then training the acoustic models by using the training data by the native speaker; reducing a number of triphone-based acoustic models by using a state-tying scheme; and increasing a mixture density of the state-tied triphone-based acoustic models.

Preferably, according to example embodiments of the present invention, the step of expanding the monophone-based acoustic models to the triphone-based acoustic models and then training the acoustic models by using the training data by the native speaker includes the steps of: locating all triphone-based acoustic models having a central phone (b) of a triphone (a−b+c) in a parent node of a decision tree; locating each of the triphone-based acoustic models, which has been located in the parent node, in a corresponding terminal node through a decision questionnaire; and tying the triphone-based acoustic models located in terminal nodes as one representative acoustic model.

Preferably, according to example embodiments of the present invention, in the monophone confusion matrix, a row array includes pronunciations which must be recognized, and a column array includes pronunciations recognized from a non-native speaker's speech.

Preferably, according to example embodiments of the present invention, the obtaining the variation pronunciation by analyzing the recognition result is achieved by taking an element having a largest value among elements of the confusion matrix.

Preferably, according to example embodiments of the present invention, wherein the step for adapting an acoustic model by using the analyzed variation pronunciation so that the acoustic model may be adapted for the non-native speaker's speech includes the steps of: creating monophone-based acoustic models by using training data by a native speaker, and then creating triphone-based acoustic models; state-tying the created triphone-based acoustic models according to whether there is pronunciation variation by the non-native speaker; and increasing a mixture density of the state-tied triphone-based acoustic models.

Preferably, according to example embodiments of the present invention, when there is no pronunciation variation by the non-native speaker, a state-tying process, which has been used in the step of creating the speech recognition system having been trained by the native speaker's speech, is used for state-tying the created triphone-based acoustic models.

Preferably, according to example embodiments of the present invention, when there is pronunciation variation by the non-native speaker, the state-tying the created triphone-based acoustic models includes the steps of: locating all triphone-based acoustic models each of which has a variation pronunciation (b') by a non-native speaker as a central phone (b') thereof, as well as all triphone-based acoustic models each of which has a monophone to be state-tied as a central phone (b) thereof, in a parent node; and disposing each of the triphone-based acoustic models, which have been located in the parent node, in a corresponding terminal node, and tying the triphone-based acoustic models as one representative acoustic model.

BRIEF DESCRIPTION OF THE DRAWINGS

The above and other aspects, features and advantages of the present invention will be more apparent from the following detailed description taken in conjunction with the accompanying drawings, in which:

FIG. 6 is a view illustrating a monophone confusion matrix of vowels which have been obtained in a pronunciation variation analysis step for a non-native speaker's speech according to an exemplary embodiment of the present invention;

FIG. 7 is a view illustrating a monophone confusion matrix of consonants which have been obtained in a pronunciation variation analysis step of a non-native speaker's speech according to an exemplary embodiment of the present invention;

FIG. 8 is a view illustrating only variation pronunciations of a monophone confusion matrix which have been obtained in a pronunciation variation analysis step of a non-native speaker's speech according to an exemplary embodiment of the present invention;

MODE FOR THE INVENTION

Figure 1:
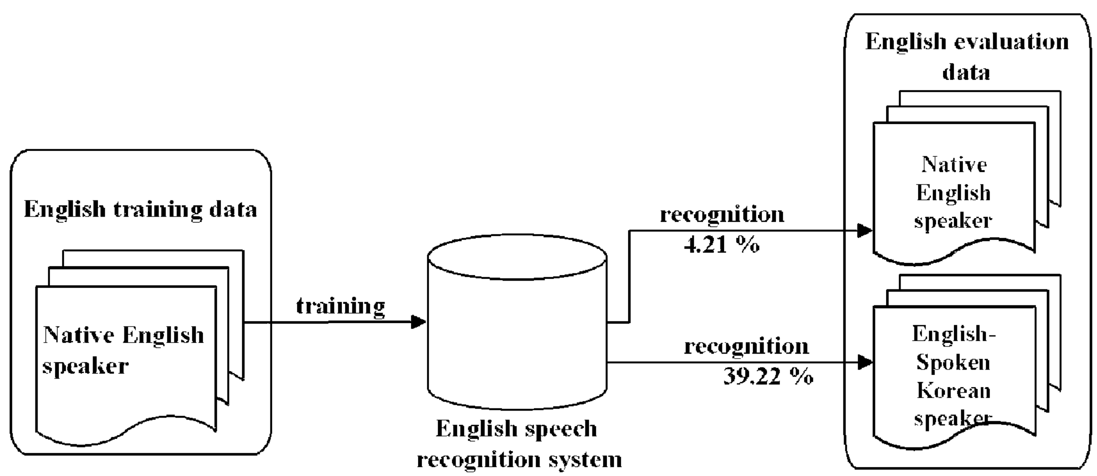
FIG. 1 is a view illustrating the effect of recognition performance for a non-native speaker's English speech in a speech recognition system which has been trained by an English speech of a native speaker.
Figure 2:
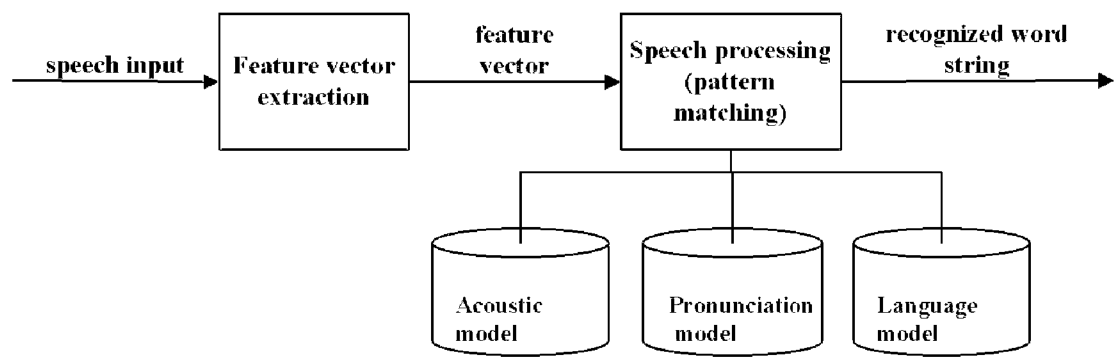
FIG. 2 is a view illustrating the configuration of a continuous speech recognition system.
Figure 3:
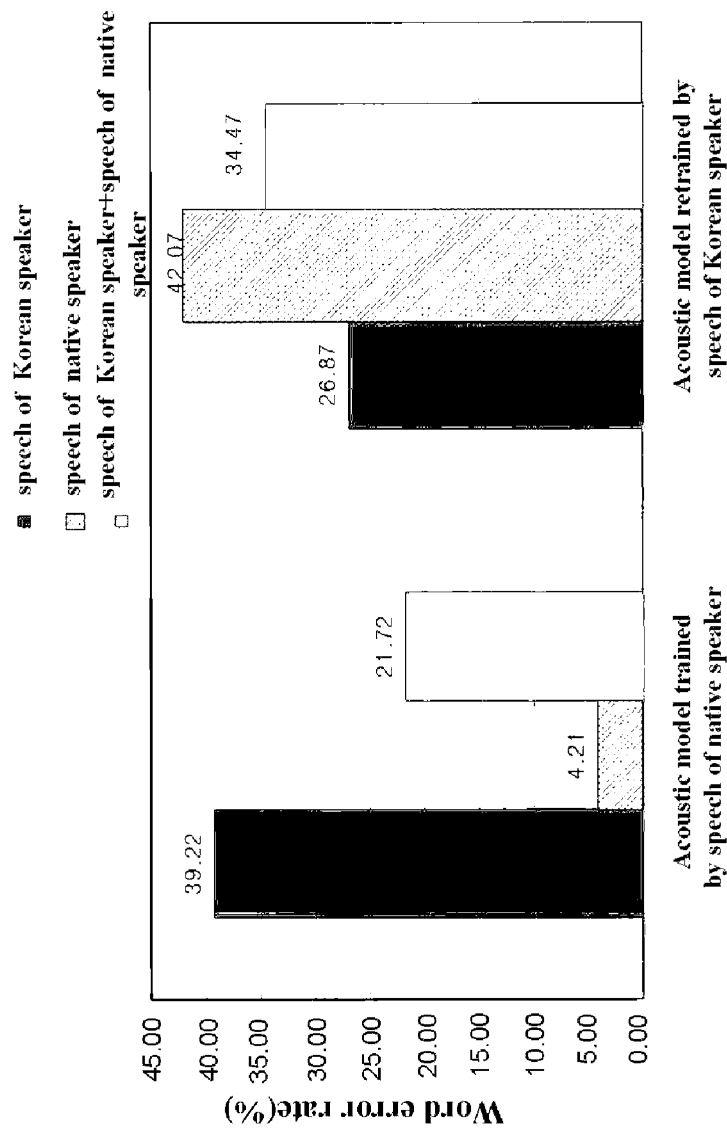
FIG. 3 is a view illustrating the effect of recognition performance for a native speaker's speech when an acoustic model is retrained by the English speech of a non-native speaker.
Figure 4:
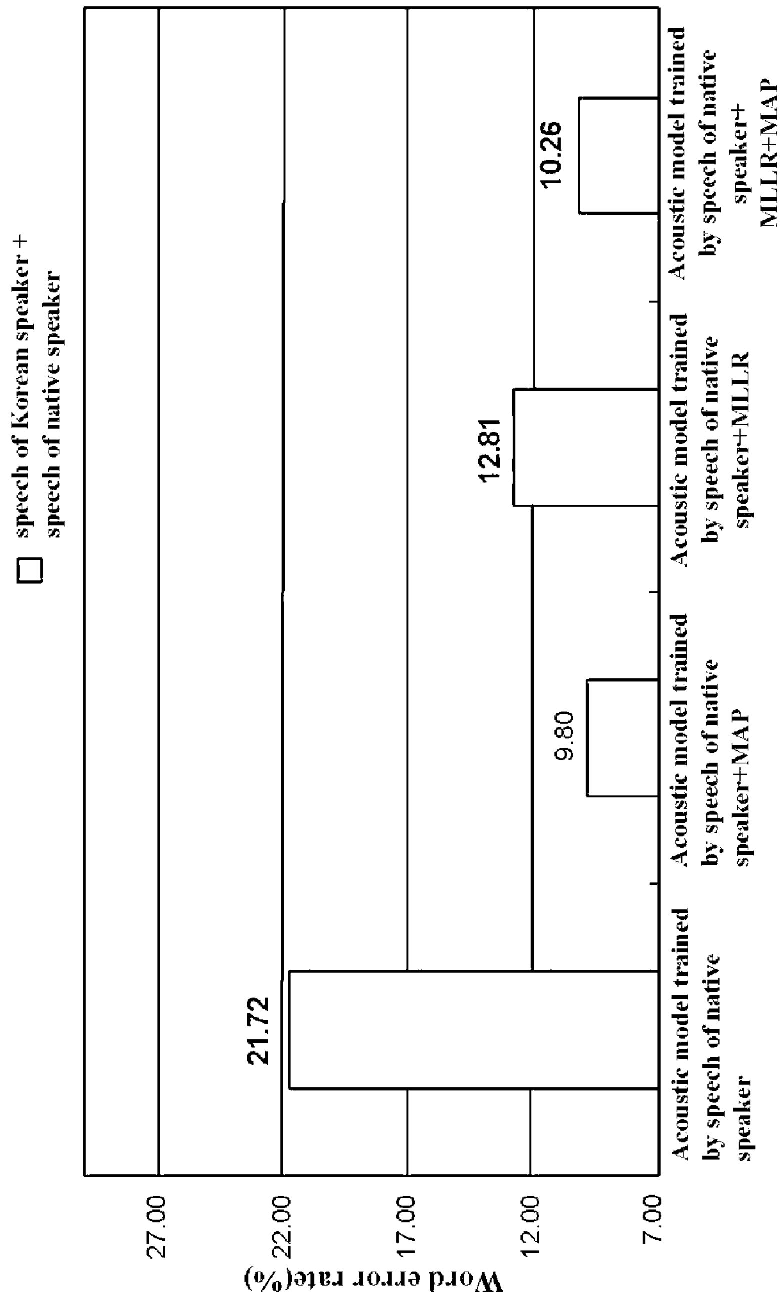
FIG. 4 is a view illustrating the effect of average recognition performance for a native speaker's speech and a non-native speaker's speech when an acoustic model is adapted to the speech of a non-native speaker.

Hereinafter, one exemplary embodiment of the present invention will be described with reference to the accompanying drawings. It is to be noted that the same elements are indicated with the same reference numerals throughout the drawings. In the following description of the embodiment of the present invention, a detailed description of known functions and configurations incorporated herein will be omitted when it may obscure the subject matter of the present invention.

In order to enhance the recognition performance for a non-native speaker's speech, pronunciation variations by a non-native speaker are examined by analyzing the pronunciations of the non-native speaker's speech. Thereafter, a scheme of adjusting an acoustic model adaptively to non-native speaker's speech based on the analyzed pronunciation variations is used. Therefore, the present invention provides a method which includes a pronunciation variation analysis step for a non-native speaker's speech and an acoustic model adaptation step based on the analyzed pronunciation variation.

Pronunciation Variation Analysis Step for Non-Native Speaker's Speech

Figure 5:
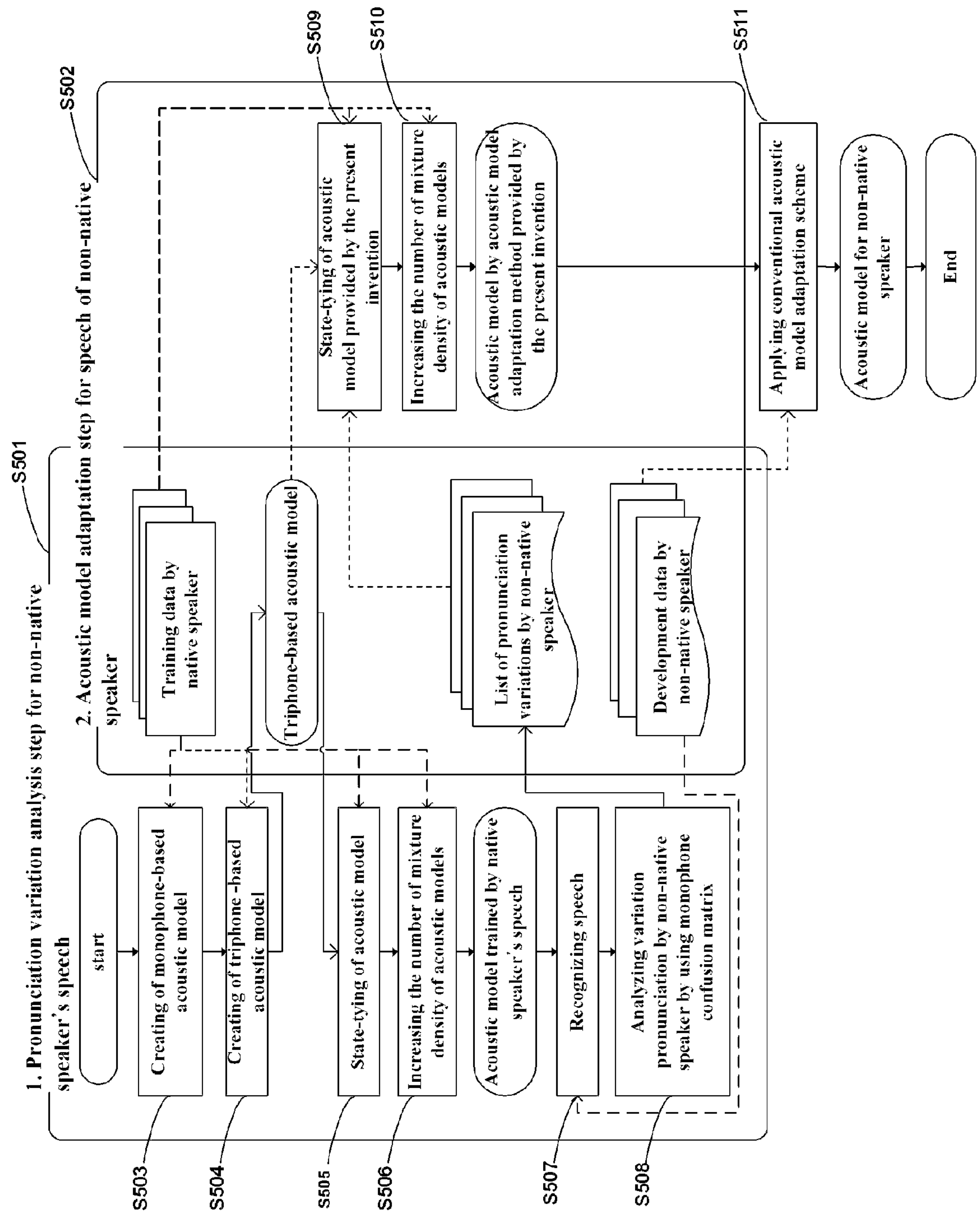
FIG. 5 is a view illustrating an acoustic model adaptation process for enhancing the recognition performance for a non-native speaker's speech according to an exemplary embodiment of the present invention.

The pronunciation variation analysis step for a non-native speaker's speech according to an exemplary embodiment of the present invention is based on data, in which pronunciation variation is examined by analyzing the pronunciation of a non-native speaker's speech, which will be described with reference to step 501 in FIG. 5. This step includes a process of creating a speech recognition system which has been trained by a native speaker's speech, a process of creating a monophone confusion matrix after making the speech recognition system recognize a non-native speaker's speech, and a process of obtaining pronunciation variation by analyzing a result of the recognition. In order to perform this step, training data by a native speaker and development by a non-native speaker are used.

A process of training an acoustic model by a native speaker's speech in order to create a continuous speech recognition system is shown in steps 503 through 506. In other words, by using training data by a native speaker, a monophone-based acoustic model is created in step 503. Since a continuous speech recognition system generally uses a triphone-based acoustic model, a monophone-based acoustic model is expanded into a triphone-based acoustic model, as shown in step 504, and then the triphone-based acoustic model is trained from training data by a native speaker. Since it is difficult to obtain training data enough to train a triphone-based acoustic model, a method of reducing the number of triphone-based acoustic models by using a state-tying scheme, as shown in step 505, may be used. There are a data-driven state-tying scheme and a state-tying scheme using a decision tree, in which the state-tying scheme using a decision tree is used to achieve the present invention.

Figure 9:
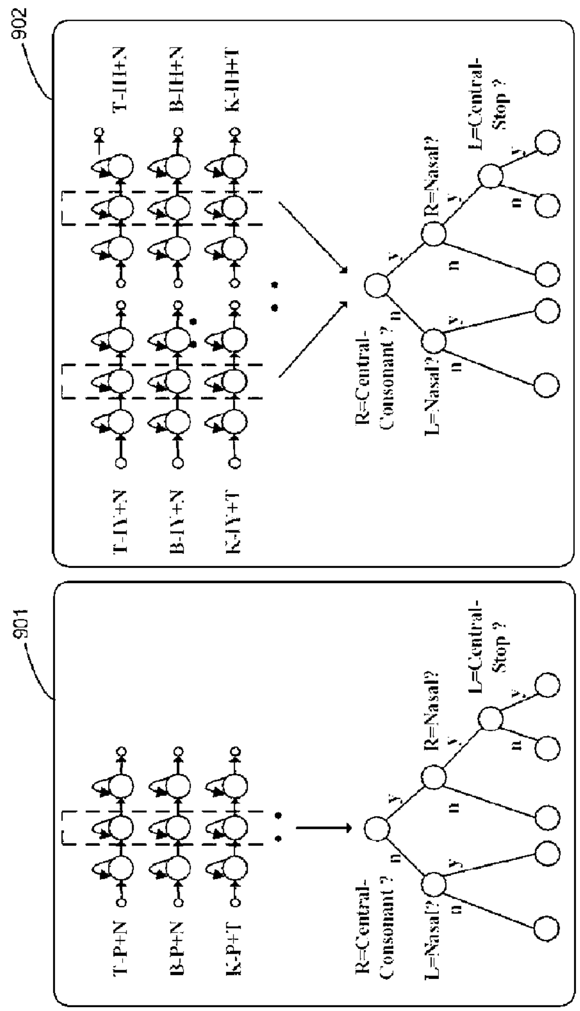
FIG. 9 is a view illustrating a state-tying scheme for an acoustic model training process in a speech recognition system according to an exemplary embodiment of the present invention.

A typical decision-tree-based state-tying scheme is subjected to the following processes. First, all triphone-based acoustic models having the same central phone "b" in a triphone "a−b+c" are disposed in parent nodes of the decision tree. Second, the triphone-based acoustic models disposed in the parent nodes are individually disposed at corresponding terminal nodes through a decision questionnaire. Finally, the triphone-based acoustic models collected in the terminal nodes are shared as one representative acoustic model. Reference numeral 901 in FIG. 9 shows an example in which triphone-based acoustic models having /P/ as the central phone of a triphone are state-tied.

By increasing the mixture density of the state-tied acoustic models, as shown in step 506, finally training of the acoustic models is performed, thereby completing the acoustic models.

The speech recognition system trained by the speech of the native speaker recognizes development data by a non-native speaker based on monophone, as shown in step 507. In step 508, a monophone confusion matrix is created by using a result of the monophone-based recognition, and pronunciation variation of a non-native speaker's speech is analyzed based on the monophone confusion matrix. First, the monophone confusion matrix expresses a relation between a pronunciation which must be recognized and a recognized pronunciation based on a result of the recognition. Herein, it is assumed that the most misrecognized pronunciation corresponds to a pronunciation which is frequently varied by the speech of non-native speakers.

The monophone confusion matrix used in the present invention will now be described in detail. In the monophone confusion matrix, a row array includes pronunciations which must be recognized, and a column array includes pronunciations recognized from a non-native speaker's speech. Each value of the elements of the confusion matrix represents a ratio of recognized pronunciations to pronunciations which must be recognized, and is expressed as a relative frequency. That is, the number of recognition times of pronunciations which must be recognized is calculated, and then the number of recognition times is normalized by dividing the number of recognition times by a total number of pronunciations which must be recognized in a development set, thereby obtaining a frequency thereof. For example, when it is assumed that a monophone "EH" has been pronounced 30 times by a non-native speaker, and the pronounced "EH" has been recognized as "AE" 10 times, the elements of the confusion matrix is calculated as the following equation.

$$\alpha_{EHAE} = \frac{\text{number of times wherein } EH \text{ is pronounced as } AE \text{ by non-native speaker}}{\text{number of times wherein } EH \text{ must be recognized}} = \frac{10}{30} \approx 0.333\%$$

FIGS. 6 and 7 show examples in which monophone confusion matrices are created from results obtained after a speech recognition system trained by an English speech of a native speaker recognizes an English speech of a Korean speaker, and are views illustrating a monophone confusion matrix for vowels and a monophone confusion matrix for consonants, respectively. Herein, all monophones are expressed using capital alphabets.

Finally, from the monophone confusion matrix, a variation pronunciation by a non-native speaker is decided by taking an element having the largest value among elements other than diagonal elements in the confusion matrix. According to an exemplary embodiment of the present invention, reference values of the largest values are obtained by experiment, and are decided to be 0.13 and 0.16 for vowels and consonants, respectively. In the monophone confusion matrices of FIGS. 6 and 7, shadowed elements correspond to values larger than the reference value for each of the vowel and consonant, and represent pronunciation variations in the English speech of the Korean speaker. When only six pronunciation variations (CH/→/T/, /IH/→/IY/, /OY/→/IY/, /ER/→/R/, /UH/→/OW/ and /EH/→/AE/) obtained by analyzing the monophone confusion matrices of FIGS. 6 and 7 are selected, the monophone confusion matrices may be summarized as shown in FIG. 8. It can be understood that the pronunciation variation analysis based on data obtained by a non-native speaker, which is used in the present invention, has a high correlation with other pronunciation variation analysis based on linguistic knowledge resulting from other research.

Acoustic Model Change Step for Enhancing Recognition Performance for Speech of Non-Native Speaker When acoustic models are created to which an acoustic model adaptation scheme for enhancing the recognition performance for a non-native speaker's speech is applied, an acoustic model adaptation step is a principal process in a state-tying scheme based on pronunciation variations caused by a non-native speaker, the entire process for which will now be described in detail with reference to step 502 in FIG. 5. In order to analyze pronunciation variations caused by a non-native speaker, expert knowledge such as philology or the aforementioned data-driven scheme may be used.

As shown in step 502, steps 503 and 504 of creating a monophone-based acoustic model by using training data by a native speaker and then creating a triphone-based acoustic model are the same as the conventional acoustic model training steps. The triphone-based acoustic model obtained as a result of step 504 is subjected to a state-tying process of step 509, similar to step 505. Different from step 505, the state-tying process of step 509 is differently performed based on whether or not a pronunciation variation (b→b') by a non-native speaker exists with respect to the central phone "b" of a triphone "a−b+c."

First, when a pronunciation variation by a non-native speaker does not exist, the state-tying process of step 509 is performed in the same way as that of step 505.

Second, when a pronunciation variation (b→b') by a non-native speaker exists, not only all triphone-based acoustic models having a monophone to be state-tied as the central phone "b" thereof, but also all triphone-based acoustic models having a variation pronunciation "b'" by a non-native speaker for a monophone to be state-tied as the central phone "b'" thereof are disposed in parent nodes of a decision tree. Thereafter, the triphone-based acoustic models disposed in the parent nodes are individually disposed at corresponding terminal nodes through a decision questionnaire, and are tied as one representative acoustic model.

Reference numeral 902 in FIG. 9 shows an example in which triphone-based acoustic models are state-tied when the pronunciation of a monophone /IH/ to be state-tied is varied into /IY/ by a non-native speaker, wherein triphone-based acoustic models having /IH/ as the central phone thereof and triphone-based acoustic models having /IY/ as the central phone thereof are disposed in parent nodes of a decision tree. The mixture density of the state-tied triphone-based acoustic models increases in step 510, which is the same as that of step 506. Acoustic models created as a result of step 510 of increasing the mixture density of the state-tied triphone-based acoustic models correspond to the finally adapted acoustic models according to the method of the present invention.

In step 511, the conventional acoustic model adaptation scheme, such as MLLR, MAP, etc., is applied to the acoustic models which have been trained to enhance the recognition performance for speech of a non-native speaker according to the present invention. Step 511 is an optional step for further enhancing the recognition performance for speech of a non-native speaker.

Performance Evaluation of Acoustic Model Change Scheme According to the Present Invention First, recognition performance is evaluated when the method according to an example embodiment of the present invention is applied to acoustic models trained by the speech of a native speaker, and then recognition performance is evaluated when the method according to an example embodiment of the present invention and a conventional acoustic model adaptation scheme (MAP, MLLR, combination of MAP and MLLR, etc.) are combined.

Figure 10:
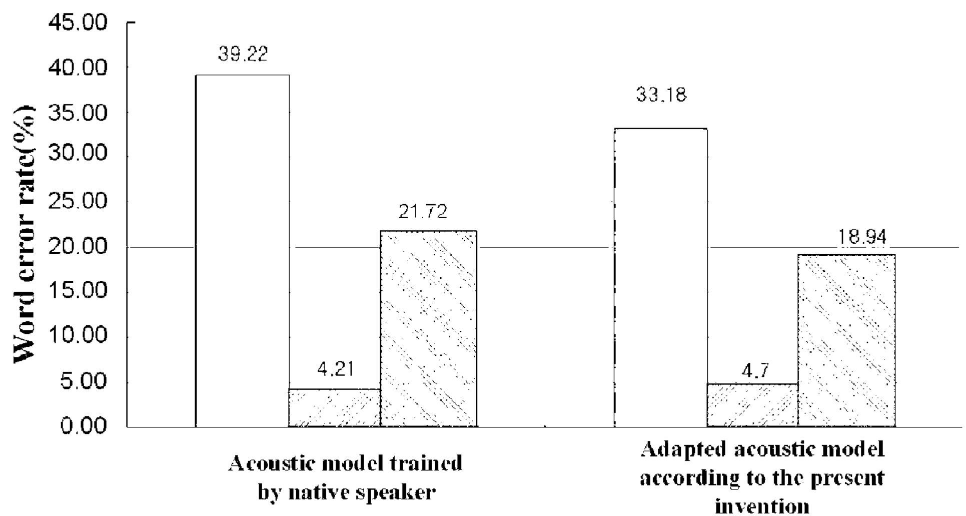
FIG. 10 is a view illustrating performance evaluation of an adapted acoustic model according to an exemplary embodiment of the present invention.

FIG. 10 shows an example of recognition performance when the method according to an example embodiment of the present invention is applied to an English speech recognition system for an English speech of a Korean. Herein, in order to apply the acoustic model adaptation method according to an example embodiment of the present invention, six pronunciation variations, that is, CH/→/T/, /IH/→/IY/, /OY/→/IY/, /ER/→/R/, /UH/→/OW/ and /EH/→/AE/, obtained in FIGS. 6, 7 and 8 are used for the analysis of English pronunciation of a Korean. In other words, when the method according to an example embodiment of the present invention is applied to the training process of acoustic models, the word error rate of English speech of a Korean speaker is 33.1% and thus the word error rate is relatively reduced by about 15.40%, and the word error rate of the English speech of a native speaker is 4.70% and thus the degradation of the recognition performance is not so much. Consequently, it can be understood that when an example embodiment of the present invention is applied to create acoustic models, the average word error rate of a Korean speaker and a native speaker is 18.94% and thus the word error rate is relatively reduced by about 12.80%.

Figure 11:
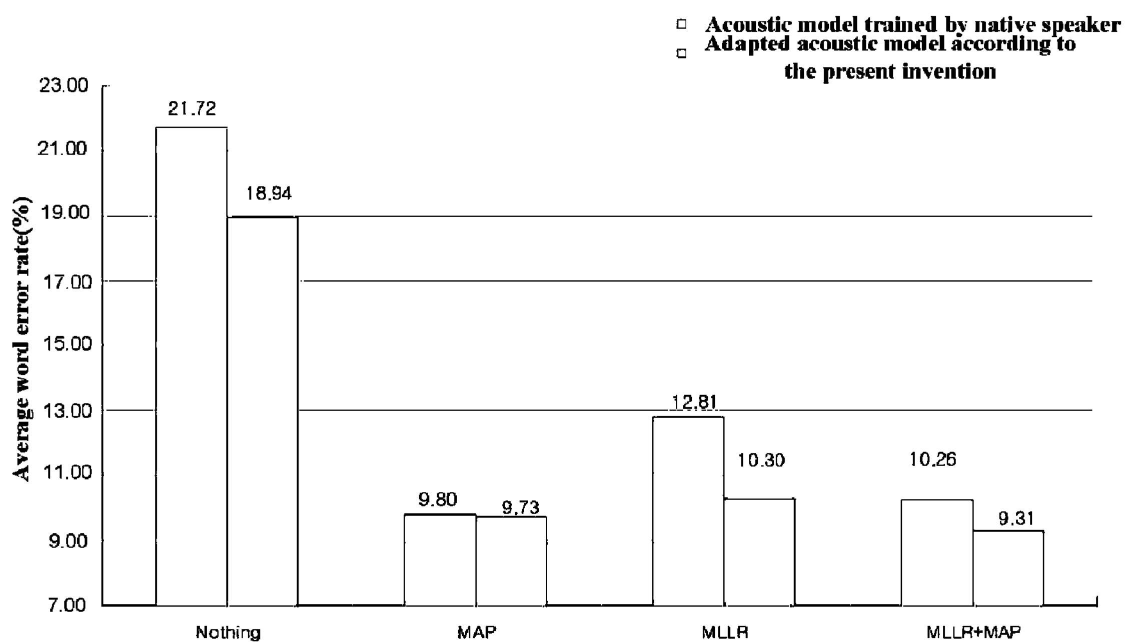
FIG. 11 is a view illustrating performance evaluation of a speech recognition system in which the acoustic model adaptation method according to an exemplary embodiment of the present invention and a conventional acoustic model adaptation scheme are combined.

FIG. 11 shows an example of recognition performance when an example embodiment of the present invention and a conventional acoustic model adaptation scheme (MAP, MLLR, combination of MAP and MLLR, etc.) are combined and applied to an English speech recognition system for English speech of a Korean. Herein, recognition performance for the English speech of a Korean speaker and a native speaker is described. When the MAP is applied to the adapted acoustic models according to the method according to an example embodiment of the present invention, the word error rate is 9.73% and thus the word error rate is relatively reduced by about 55.20%, and when the MLLR is applied to the adapted acoustic models according to the method according to an example embodiment of the present invention, the word error rate is 10.30% and thus the word error rate is relatively reduced by about 45.62%. Also, when a combination of the MAP and MLLR is applied to the adapted acoustic models according to the method according to an example embodiment of the present invention, the word error rate is 9.31% and thus the word error rate is relatively reduced by about 57.14%. Finally, it can be understood that the best recognition performance is achieved when a combination of the MAP and MLLR is applied to the adapted acoustic models according to the method according to an example embodiment of the present invention.

While the present invention has been shown and described with reference to certain exemplary embodiments thereof, it will be understood by those skilled in the art that various changes in form and details may be made therein without departing from the spirit and scope of the invention as defined by the appended claims.

INDUSTRIAL APPLICABILITY

According to example embodiments of the present invention as described above, it is possible to enhance the performance of a speech recognition system for speech of a non-native speaker, and example embodiments of the present invention can reduce the degradation in the performance of the speech recognition system for speech of a native speaker.

Also, since pronunciation variation by a non-native speaker's speech is analyzed based on speech data, it is possible to reduce the human effort required thereof.

In addition, since pronunciation variations by a non-native speaker's speech are analyzed based on speech data, it is possible to analyze the pronunciation variations even with insufficient information about non-native speakers, and it is possible to provide a more-enhanced speech recognition performance through a combination with a conventional scheme.

The invention claimed is:

1. An acoustic model adaptation method comprising:

creating monophone-based acoustic models by using training data by a native speaker;

expanding the monophone-based acoustic models to triphone-based acoustic models;

performing a pronunciation variation analysis for examining a variation pronunciation of a non-native speaker through pronunciation analysis of a non-native speaker's speech by using the triphone-based acoustic models; and performing adaptation of an acoustic model by using the analyzed variation pronunciation so that the acoustic model may be adapted for the non-native speaker's speech, wherein the performing a pronunciation variation analysis includes, reducing a number of triphone-based acoustic models by using a state-tying scheme;

creating a speech recognition system which has been trained by a native speaker's speech by increasing a mixture density of the state-tied triphone-based acoustic models;

making the speech recognition system recognize a non-native speaker's speech, and then creating a monophone confusion matrix; and obtaining the variation pronunciation by analyzing the monophone confusion matrix.

2. The acoustic model adaptation method as claimed in claim 1, wherein the expanding the monophone-based acoustic models to the triphone-based acoustic models comprises a training the acoustic models by using the training data by the native speaker wherein the training the acoustic models by using the native speaker, wherein the training the acoustic models comprises:

locating all triphone-based acoustic models having a central phone (b) of a triphone (a−b+c) in a parent node of a decision tree;

locating each of the triphone-based acoustic models, which has been located in the parent node, in a corresponding terminal node through a decision questionnaire; and tying the triphone-based acoustic models located in terminal nodes as one representative acoustic model.

3. The acoustic model adaptation method as claimed in claim 1, wherein, in the monophone confusion matrix, a row array includes pronunciations which must be recognized, and a column array includes pronunciations recognized from a non-native speaker's speech.

4. The acoustic model adaptation method as claimed in claim 1, wherein the obtaining the variation pronunciation by analyzing the monophone confusion matrix is achieved by taking an element having a largest value among elements of the confusion matrix.

5. An apparatus for recognizing a non-native speaker's speech by using acoustic models which have been created according to the acoustic model adaptation method claimed in claim 1.

6. An acoustic model adaptation method comprising:

creating monophone-based acoustic models by using training data by a native speaker;

expanding the monophone-based acoustic models to triphone-based acoustic models;

performing a pronunciation variation analysis for examining a variation pronunciation of a non-native speaker through pronunciation analysis of a non-native speaker's speech by using the triphone-based acoustic models; and performing adaptation of an acoustic model by using the analyzed variation pronunciation so that the acoustic model may be adapted for the non-native speaker's speech, wherein the performing adaption of an acoustic model by using the analyzed variation pronunciation so that the acoustic model may be adapted for the non-native speaker's speech includes, state-tying the created triphone-based acoustic models according to whether there is pronunciation variation by the non-native speaker; and increasing a mixture density of the state-tied triphone-based acoustic models.

7. The acoustic model adaptation method as claimed in claim 6, wherein, when there is no pronunciation variation by the non-native speaker, a state-tying process, which has been used in creating the speech recognition system having been trained by the native speaker's speech, is used for state-tying the created triphone-based acoustic models.

8. The acoustic model adaptation method as claimed in claim 6, wherein, when there is pronunciation variation by the non-native speaker, the state-tying the created triphone-based acoustic models comprises:

locating all triphone-based acoustic models each of which has a variation pronunciation (b') by a non-native speaker as a central phone (b') thereof, as well as all triphone-based acoustic models each of which has a monophone to be state-tied as a central phone (b) thereof, in a parent node; and disposing each of the triphone-based acoustic models, which have been located in the parent node, in a corresponding terminal node, and tying the triphone-based acoustic models as one representative acoustic model.

* * * * *